United States Patent [19]

van Gorp

[11] Patent Number: 4,611,407

[45] Date of Patent: Sep. 16, 1986

[54] PIVOT ASSEMBLY

[76] Inventor: Keith N. van Gorp, 28 Avery Court, Greenbank, Queensland 4124, Australia

[21] Appl. No.: 648,157

[22] PCT Filed: Jan. 13, 1984

[86] PCT No.: PCT/AU84/00009

§ 371 Date: Sep. 4, 1984

§ 102(e) Date: Sep. 4, 1984

[87] PCT Pub. No.: WO84/02754

PCT Pub. Date: Jul. 19, 1984

[30] Foreign Application Priority Data

Jan. 13, 1983 [AU] Australia ............... PF7586

[51] Int. Cl.⁴ ............................. B43L 7/06
[52] U.S. Cl. ................................. 33/471
[58] Field of Search ............ 33/468, 469, 471, 465

[56] References Cited

U.S. PATENT DOCUMENTS

| | | | |
|---|---|---|---|
| 161,392 | 3/1875 | Dodd | 33/471 |
| 714,404 | 11/1902 | Schaller | 33/468 |
| 794,569 | 7/1905 | Thomas | 33/468 |
| 1,331,415 | 2/1920 | Civitts | 33/471 |
| 2,435,529 | 2/1948 | Brockley | 33/468 |
| 2,972,191 | 2/1961 | Kichta | 33/469 |

FOREIGN PATENT DOCUMENTS 321058 5/1902 France ......................... 33/471
6243 of 1899 United Kingdom ............ 33/468

Primary Examiner—Richard R. Stearns
Attorney, Agent, or Firm—Murray and Whisenhunt

[57] ABSTRACT

A pivot assembly for a guide or marking tool (10) comprising a stock (12) with a reference edge (31) alignable with a desired datum (36), a blade (13) with a sighting, guiding or marking edge (16) and a semi-circular segment (18) provided with angle indicia (19). The stock (12) is pivotally connected to the blade (13) so that the angle between the reference edge (31) and the sighting edge (16) may be adjusted to a predetermined setting and the pivot axis (9) of the stock (12) relative to the blade (13) is located at the intersection between the reference edge (31) and the sighting edge (16) at all relative angular settings between the stock (12) and the blade (13). Pivoting of the stock and blade is effectuated by arcuate guide tracks on the stock (12) mating with corresponding depending flanges on the undersurface of segment (18). A slot (22) concentric with the guide tracks is provided in the segment (18), whereby lightening of the thumb wheel (24) clamps the segment (18) firmly against the upper surface (28) of the stock (12).

11 Claims, 5 Drawing Figures

PIVOT ASSEMBLY

This invention relates to guide or marking tools.

Many instruments or tools have been proposed in the past to enable guide lines or marking lines to be marked on a workpiece at a predetermined angle to another line or edge. It is a general disadvantage of such tools that the point of intersection between the reference line or edge and the guiding or marking edge changes when the tool is adjusted for different angles. This necessitates in use a repositioning of the tool on the workpiece. It is a further disadvantage of such tools that it is difficult to incorporate a length marking scale on the guiding or marking edge as the zero or reference point of the scale shifts relative to the reference line or edge as the angle of the tool is adjusted. Accordingly in use, the angle is marked and then a tape measure is used to measure along the marked line. This can lead to inaccurate marking. Similar disavantages are also found in other devices that are used for marking or measuring various angles such as in various types of drafting or surveying equipment.

It is an object of this invention to provide guide or marking tools which will alleviate the abovementioned disadvantages and which will be reliable and efficient in use. Other objects and advantages of this invention will hereinafter become apparent.

With the foregoing and other objects in view this invention in one aspect resides broadly in a pivot assembly for adjustably connecting a pair of members together for relative pivotal movement, said pivot assembly an including arcuate guide faced on one said member; locating means on the other said member adapted to abut said guide face so as to locate said other member relative to said one member and retaining means for securing the members together.

If desired there may be provided a plurality of guide faces on said one member and in the preferred form the guide face or faces are sectorial and are arranged concentrically with one another. The guide face or faces may be formed by providing sectorial slot or slots or grooves in said one member. The locating means may be in the form of a complementary abutment face on said other member adapted to abut said guide face or it may be constituted by a pair of spaced pins or the like fixed to said other member and adapted to abut said guide face at spaced locations therealong. The pins may be fixed or rotatable if desired.

Preferably the retaining means is in the form of a threaded stem fixed to one said member and passing through a slot in the other said member, said slot being disposed concentrically with said guide face and there being provided a nut on said threaded stem rotatable to secure the members together.

Alternatively the retaining means may include or be constituted by a captive arcuate slot or groove in one said member concentric with or constituting said guide face and complementary locating means in the other said member adapted to engage and be held captive in said slot. The captive slot may be in the form of a T-slot or a re-entrant recess of any desired configuration.

It is also preferred that the guide face is formed as a sector of a cylinder or truncated cone disposed such that its axis is coincident with a straight guide or marking edge of one said member and that abutment means having an abutment plane coincident with said axis its provided on the other said member.

In a further aspect this invention resides broadly in a guide or marking tool comprising a stock assembly and a blade assembly, the latter having an intermediate mounting segment connected pivotally to one end of said stock assembly for pivotal movement about a pivot axis and being provided with angle markings whereby its rotational position about said pivot axis may be monitored and a guiding or marking blade supported by said intermediate mounting segment for movement therewith and arranged with its guiding or marking edge coincident with said pivot axis and said stock assembly having an abutment face disposed in a plane containing said pivot axis whereby it may be engaged against a reference edge of a workpiece so as to position the guiding or marking blade on the workpiece for pivotal movement thereacross about its pivot axis supported at a selected position on said reference edge.

Notwithstanding any other forms that may fall within its scope one preferred form of the invention will now be described by way of example only with reference to the accompanying drawings, wherein.

Figure 1:
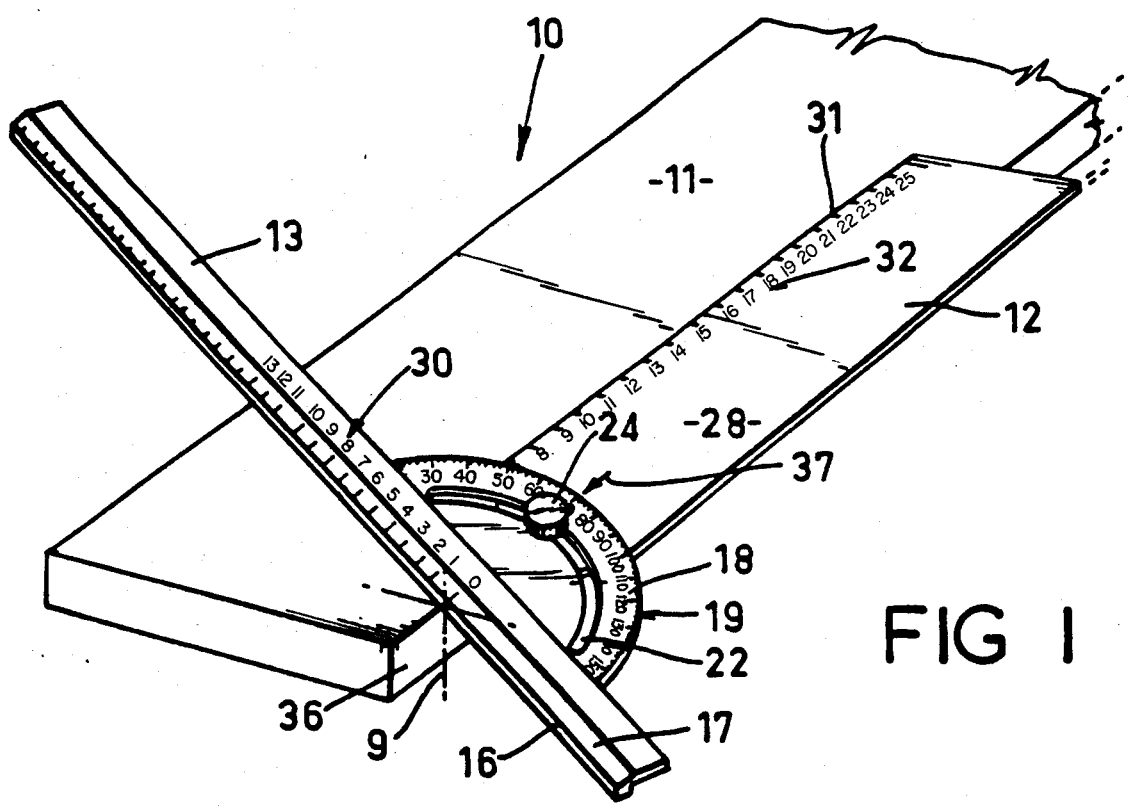
FIG. 1 is a perspective view of an adjustable circular saw guide/angle marking tool and illustrating a typical application.
Figure 2:
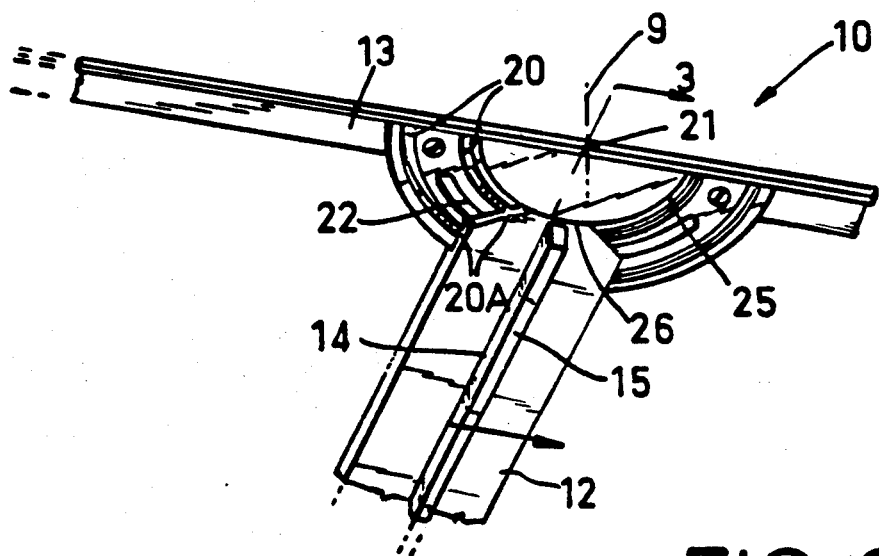
FIG. 2 is an underside perspective view of the tool illustrated in FIG. 1.

In the preferred form of the invention a tool particularly suitable for marking out a metal or timber workpiece or for guiding a power tool along that workpiece is constructed as described below although it will be appreciated that the basic invention has many other different forms and applications.

The tool 10 according to the invention when adapted for use as a tool or marking guide on a workpiece 11 comprises a stock 12 and a blade 13 both of which are elongate members and formed for example from aluminium extrusions or castings. The stock 12 incorporates a reference abutment face 14 formed by one face of a downwardly depending continuous flange 15 extending along the underside of the stock 12.

The blade 13 incorporates a straight edge 16 which forms a sighting, guiding or marking edge which may be used to guide a marking pencil or a tool such as the base plate of a power saw. When used in the latter application the shape of the edge portion 16 is such that its overall height is sufficiently low to clear any overhanging portions of a power saw. The surface 17 adjacent the guiding edge 16 is bevelled to clear any protrusions and to assist in sighting the edge 16. A semi-circular segment 18 is screwed to the blade 13 so as to protrude therefrom on the opposite side from the sighting, guiding or marking edge 16 and indicia 19 marked in degrees is provided around the outer periphery thereof. The undersurface of the segment 18 is provided with two guide grooves or tracks 20 arranged concentrically with the segment 18 and with their axis 9 coincident with the sighting, guiding or marking edge 16. The point of coincidence is designated 21 and it will be seen that this point 21 is in alignment with the abutment face 14. Complementary arcuate flanges 20A on the stock 12 engage neatly within these slots 20 whereby the members 12 and 13 are guided for relative pivotal motion with respect to one another about the common axis 9 of the tracks 20 and the flanges 20A.

The segment 18 is also provided with an arcuate locking slot 22 extending through the segment and concentric with the guide tracks 20. A stud 23 is fixed to the stock 12 to extend through this slot 22 and a knurled thumb wheel 24 threadedly engageable on the stud 23 is provided to lock the members 12 and 13 in any desired pivotal relationship. Tightening of the thumb wheel 24 clamps the segment 18 firmly against the upper surface 28 of the stock 12.

Figure 3:
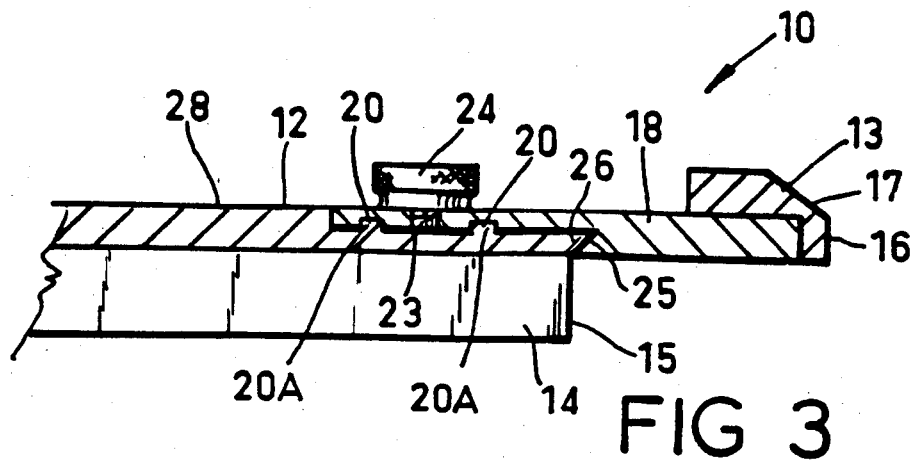
FIG. 3 is a cross-sectional view taken along the line 3—3 of FIG. 2.

In the preferred form of the invention the thumb wheel 24 is of low profile as shown (i.e. of the same height as the upper surface of the blade 13) so that any overhanging portion of a tool which is guided by the edge 16 will clear the thumb wheel 24. The segment 18 is also provided with a part frusto-conical downwardly depending flange 25 which extends inwardly at a re-entrant angle as illustrated in FIG. 3. The arcuate end portion 26 of the stock 12 is shaped complementary to engage with the flange 25 whereby the stock 12 is held captive in the segment 18 so as to reduce the separation loads applied to the stud 23. In this manner the stock 12 is engaged with and may pivot relative to the blade 13 by sliding of the flanges 20A in the groove or tracks 20 and by the engagement of the end 26 with the similarly shaped and bevelled part circular flange 25 so that the stock 12 can pivot relative to the blade 13 about the pivot axis 9 which lies on the sighting, guiding or marking edge 5.

The edge 16 is provided with length measuring indicia 30 having their zero or reference point at the pivot axis 9. The inner edge 31 of the stock 12 is also provided with length measuring indicia 32 having a zero or reference point at the edge 16 when the latter is at right angles to the inner edge 31. In this position the angular indicia 19 on the segment 18 indicates 90°.

In use of the tool 10 for example for marking or guiding relative to the edge 35 of a workpiece 11 the tool 10 is placed face down on the workpiece 11 so that the lower faces of the stock 12 and blade 13 sit on the surface of the workpiece. The flange 14 is then drawn towards the reference face 36 of the workpiece 11 where it is held in abutment therewith. The angle of the blade 13 relative to the reference face 36 of the workpiece 11 may then be adjusted by loosening the thumb wheel 24, moving the blade 13 to the desired angle which may be measured by sighting a reference mark or arrow 37 against the angular indicia 19 and locking the desired angle on the tool by tightening the thumb wheel 24. The pivot axis 9 or zero position of the blade 13 may then be moved to the desired position of the mark or cut by sliding the flange 15 along the reference face 36 of the workpiece 11 whereupon the desired marking may be made along the guiding edge 16 and a measurement back from the edge of the workpiece may also be made directly using the indicia 30. It is a particular feature of the illustrated tool that the reference point for the indicia 30 is located at the pivot axis 9 between the first and second members whereby it will remain in alignment with the reference face 36 regardless of the angle set between the stock 12 and blade 13 and whereby the indicia 30 may be used at all angles to measure the distance back from the reference edge of the workpiece. Where desired the tool may be held fixedly in place and the angle adjusted without altering the zero point of the indicia 30 relative to the edge of the workpiece.

A further advantage of the pivot assembly described is that it provides large bearing areas for accurate control of pivotal movement between the members and for maintaining selected alignment therebetween even when heavy loads are applied. As such the pivot assembly will be useful in bench mounted equipment or the like for selectively positioning a workpiece for retention in the selected position during cutting or machining operations. The large bearing areas also ensure the retention of precision throughout the working life of the pivot assembly.

Figure 4:
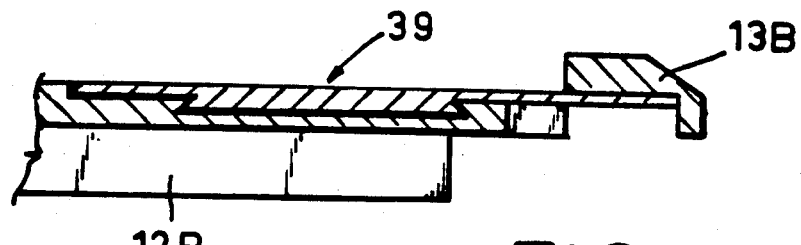
FIG. 4 is a view similar to FIG. 3 but illustrating an alternate form of pivotal connection.

FIG. 4 illustrates an alternate form of connection which is formed as an arcuate dovetail joint 39. In this embodiment any form of clamping or indexing means could be used to control the relative pivotal movement between the first member 12B and the second member 13B.

Figure 5:
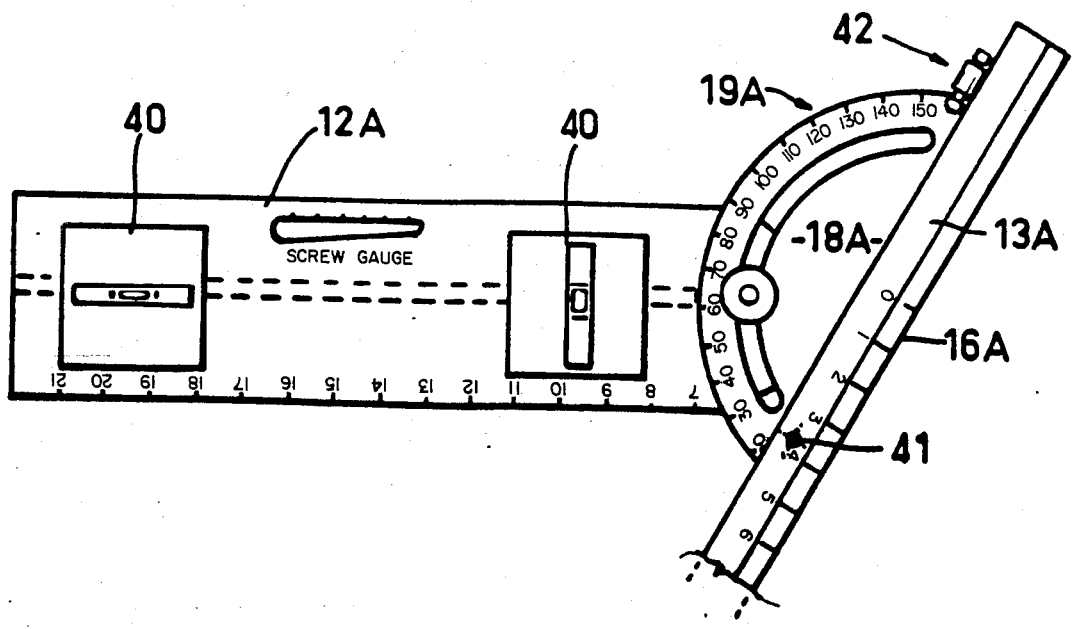
FIG. 5 is a plan view of a further embodiment of a tool made in accordance with the invention.

In the embodiment illustrated in FIG. 5 level vials 40 are provided on the stock to allow measuring of the angular position of a given item in relation to the perpendicular or horizontal plane. For this purpose the inclination of a face is measured by holding the edge 16A on or parallel to the face and by moving the first member 12A until the appropriate vial 40 indicates level. The angle reading is then read directly from the angular indicia 19A. It will also be noted that in this embodiment the elongate edge portion of the blade 13A is connected pivotally to the segments 18A at 41 whereby when not in use the blade 13A may be pivoted relative to the segment 18A to a position subsstantially co-extensive with the stock 12A. A releasable spring loaded catch assembly 42 is provided to secure the blade 13A fixedly to the segment 18A for normal use. Although the tool has been described in one particular application for use in marking or as a guiding edge for the cutting of a workpiece it will be appreciated that the principle used in the tool of placing the pivot point between two variable parts on the edge used as a sighting, guiding, marking or locating edge of one of those parts can also be employed in other types of tools or instruments such as surveying or angle sighting instruments and drafting instruments and the like. Of course all such modifications and variations as would be apparent to persons skilled in the art are deemed to fall within the broad scope and ambit of the present invention as is defined in the appended claims.

The claims defining the invention are as follows:

1. A guide or marking tool comprising a stock assembly and a blade assembly, the latter having an intermediate mounting segment connected pivotally to one end of said stock assembly for pivotal movement about a pivot axis and being provided with angle markings whereby its rotational position about said pivot axis may be monitored and a guiding or marking blade supported by said intermediate mounting segment for movement therewith and arranged with its guiding or marking edge coincident with said pivot axis and said stock assembly having an abutment face disposed in a plane containing said pivot axis whereby it may be engaged against a reference edge of a workpiece so as to position the guiding or marking blade on the workpiece for pivotal movement thereacross about its pivot axis supported at a selected position on said reference edge.

2. A guide or marking tool according to claim 1, wherein said guiding or marking edge is disposed along a measuring portion of said blade at one side of said pivot axis and an extension portion of said blade which extends from said measuring portion and beyond said pivot axis and wherein length measuring indicia are provided on said measuring portion commencing at a zero or reference point coincident with said pivot axis whereby direct length measurements from said reference edge may be made on said length measuring indicia.

3. A guide or marking tool according to claim 1, wherein said stock assembly includes a substantially solid elongate rectangular body portion and wherein said abutment face is formed on an abutment flange which extends from the underside of said body portion which forms a supporting face disposed at right angles to said abutment face and engageable with the workpiece adjacent said reference edge.

4. A guide or marking tool according to claim 3, wherein said supporting face extends between said abutment flange and a calibrated edge on said body portion, said calibrated edge being disposed parallel to said abutment flange and being provided with length measuring indicia thereon having a zero reference point which is coincident with said guiding or marking edge when the latter is disposed at right angles to said abutment face.

5. A guide or marking tool according to claim 4, wherein said intermediate mounting segment includes an angular scale arranged concentrically about said pivot axis and adapted to co-operate with indicator means on said stock assembly for indicating the angle between said abutment face and said guiding or marking edge.

6. A guide or marking tool according to claim 3, wherein said guiding or marking blade is releasable for movement relative to said intermediate mounting segment whereby said guiding or marking blade may be pivoted to a folded position alongside said stock assembly.

7. A guide or marking tool according to claim 6, wherein said blade in its folded position is supported parallel to said abutment flange.

8. A guide or marking tool according to claim 7, wherein there are provided a pair of level vials on said stock assembly arranged to indicate vertical and horizontal positions of said abutment flange.

9. A guide or marking tool according to claim 8, wherein retaining means are provided for securing said intermediate mounting segment to said stock assembly, said retaining means including a post fixed to said stock assembly and passing through an arcuate slot formed in said intermediate mounting segment and arranged concentrically with said guide recess and/or said guide flange and clamping means engaged on said post and operable to clamp said intermediate mounting segment to said stock assembly.

10. A guide or marking tool according to claim 3, wherein said intermediate mounting segment is connected pivotally to said stock assembly by a pivot assembly which includes an arcuate guide flange on either said stock assembly or said intermediate mounting segment and slidably received in an arcuate guide recess in the other said stock assembly or intermediate mounting segment.

11. A guide or marking tool according to claim 10, wherein said arcuate guide flange is held captive in said guide recess so as to retain said intermediate mounting segment on said stock assembly.

* * * * *